Patented Oct. 18, 1932

1,883,188

UNITED STATES PATENT OFFICE

BYRON PAYNE WEBSTER, OF PLAINFIELD, NEW JERSEY, ASSIGNOR TO CHIPMAN CHEMICAL COMPANY, INC., OF BOUND BROOK, NEW JERSEY, A CORPORATION OF NEW YORK

LIGHT-DENSITY COMPOSITION OF PARIS GREEN AND CALCIUM ARSENATE AND METHOD OF MAKING THE SAME

No Drawing.   Application filed August 30, 1930. Serial No. 479,108.

The present invention relates to a composition containing Paris green and calcium arsenate and particularly to an improved composition containing Paris green and calcium arsenate, inseparable by mechanical means, and having a very light density approximating that of calcium arsenate and to a process of producing the same.

It is well known that calcium arsenate is useful for combating boll weevil and that Paris green is useful for combating boll worm and army worm. It is also generally recognized that when used as a dust, ordinary Paris green, due to its relative coarseness and low density, does not have adequate covering power. Also due to the fact that Paris green does not kill boll weevil and that calcium arsenate is not quick enough in its action to kill boll worm and army worm, it has been proposed to combine the two aforesaid insecticides as a mixture and to dust or otherwise apply the mixture to the plants to be treated. Attempts to carry the said proposal into practice were unsuccessful for various reasons. The more important reason was that the Paris green fell in one spot and the calcium arsenate fell in another spot when dusted onto plants. Although many attempts have been made to remedy the foregoing situation, none has been satisfactory and successful in practical operation.

It is an object of the present invention to overcome the disadvantages of the above named insecticides and to provide the art with an insecticide capable of effectively and satisfactorily combating a variety of insects and the like including boll weevil, boll worm and army worm.

It is another object of the invention to provide an amalgamated product containing Paris green and calcium arsenate, which can be applied to plants by means of an air duster without any substantial separation of the components or ingredients from each other.

It is a further object of the invention to provide an amalgamated product containing Paris green and calcium arsenate and a method of making the same which is more economical than prior products and processes.

Other objects and advantages of the invention will become apparent from the following description.

I have discovered that Paris green and calcium arsenate must fall together on the plants under treatment and that the Paris green and calcium arsenate must preferably be bound and amalgamated together in intimate cohesion. I have found that when Paris green and calcium arsenate are amalgamated together in accordance with my process, a stable insecticide is produced which can be reliably and effectively used to kill boll weevil, boll worm, and army worm.

According to my discovery, I amalgamate or bond Paris green and calcium arsenate together so that these insecticides will not separate even when applied to plants with air dusters. I have found that it is preferable to make a slurry of Paris green by mixing about one part of Paris green with about two parts of water. I prefer to use the type of Paris green described and claimed in my application Serial No. 479,107 filed on August 30, 1930. This type of Paris green has a relatively low density and specific gravity and about fifty to about sixty-five cubic inches weighs only a pound.

To the Paris green slurry is preferably added a slurry of calcium arsenate comprising about two and one-quarter parts of water and about one part of calcium arsenate preferably containing free lime. The temperature of the mixed slurries is preferably maintained at about 100° F. to about 120° F. The slurries are agitated thoroughly to bring the particles into intimate contact with each other and to effect a bonding or amalgamating of said particles whereby composite particles are formed which contain Paris green and calcium arsenate.

In the manufacture of ordinary Paris green, sodium sulphate is formed, which must be thoroughly washed out by decantation and filter pressing down to 1% or less. Also considerable washing is necessary to remove the last traces of water soluble arsenious oxide.

The present method of manufacturing the special Paris green slurry makes it possible to dispense with thorough washing through a filter press as sufficient sodium sulphate can be washed out of the composite insecticide by decantation. Sodium sulphate remaining after washing combines with free lime of the calcium arsenate to form insoluble calcium sulfate in the finished product. This insoluble calcium sulfate is in no way injurious to the product. In this manner, considerable economy in manufacturing as well as saving in raw material is effected.

Free water soluble arsenious oxide and lime present combine to form relatively insoluble calcium arsenite which likewise has insecticidal properties. By using Paris green from which free water soluble arsenious oxide has not been removed by excessive washing or the like, it is possible by the use of the present process to save the raw materials which usually go to waste when the conventional procedure of manufacturing Paris green is employed. In many cases, this wastage amounts to about 10% to about 15% of raw materials.

After complete agitation, the batch of material is filter pressed and is then thoroughly dried, or dried on an atmospheric drum drier. The dried product is ground to produce the finished insecticide.

In practice the finished product contains about 25% by weight of Paris green and about 75% by weight of calcium arsenate. Of course, the proportions of the two ingredients may be varied as desired to suit the particular circumstances. The finished product has a density which approximates the density of calcium arsenate, i. e., about 80–90 cubic inches of calcium arsenate weighs about one pound. Efforts to separate Paris green from calcium arsenate in the finished product mechanically or by means of an air blast show that the ingredients cannot be separated. Furthermore, examinations of the finished product under the microscope have demonstrated that it is practically impossible to discern particles of Paris green from those of calcium arsenate.

According to the process set forth in my co-pending application (Serial No. 479,107, filed August 30, 1930) a solution of copper sulfate is preferably first made by adding about 6 parts of copper sulfate to about 8.4 parts of water. To the solution of copper sulfate, a solution of sodium arsenite is added at a controlled rate. The sodium arsenite solution is preferably made by reacting about 4.3 parts of 99% white arsenic (arsenious oxide) with about 2.875 parts of soda ash in about 5.825 parts of water at a temperature of about 212° F. A solution of this sort has a specific gravity of about 15.5. In practice the sodium arsenite solution is added to the copper sulfate solution very rapidly and preferably at a rate of about 10 to 20 gallons per minute. During the addition of the sodium arsenite solution, it is preferred not to agitate the batch. After the addition has been made, moderate, intermittent agitation with a wooden paddle is preferably applied to the batch until the relatively violent reaction ceases. Thereupon acetic acid, usually 80% commercial acetic acid, is added to the batch to the extent of about one (1) part with moderate, intermittent agitation.

During the aforesaid procedure, it is important that the proper thermal conditions be maintained in the batch of reacting material. At the start of operation the temperature may be about 140° F. and at the end of operations the temperature may be about 160° F. By employing temperatures lower or higher than the aforesaid temperatures, the color of the product is affected. At the lower temperatures the reaction is considerably retarded.

After the reaction is completed, the precipitate of Paris green is filtered or separated from the solution in any suitable manner. The separated Paris green is dried in an appropriate way and is then bolted.

The following schedule gives some of the properties of my improved Paris green.

Density_____ 50–65 cubic inches/#
Combined arsenic_____ 56.25–57.00 per cent
Water soluble arsenic____1.54–1.34 per cent

*Fineness*

| Mesh | Per cent |
|---|---|
| 100 | 98.0 |
| 150 | 96.6 |
| 200 | 95.2 |
| 325 | 91.4 |

I claim:—

1. The process of forming an amalgamated product of Paris green and calcium arsenate substantially inseparable upon being air dusted which comprises forming a water slurry of Paris green, adding thereto a slurry of calcium arsenate, maintaining a temperature of about 100° F. to about 120° F., agitating said mixed slurries to effect a bonding or amalgamating said particles of Paris green with those of calcium arsenate and separating the thus amalgamated Paris green and calcium arsenate from the water.

2. The process of forming an amalgamated product of Paris green and calcium arsenate substantially inseparable upon being air dusted which comprises forming a slurry of Paris green constituted of about 1 part of the latter to about 2 parts of water, forming a slurry of calcium arsenate constituted of about one part of the latter and about 2¼ parts of water, mixing said slurries together, maintaining a temperature of about 100° F. to about 120° F. in said slurries, subjecting said slurries to agitation to effect a thorough bonding or amalgamating of the particles of Paris green with those of calcium arsenate, and separating the thus amalgamated Paris green and calcium arsenate from the water.

3. The process of forming an amalgamated product of Paris green and calcium arsenate substantially inseparable upon being air dusted which comprises forming intimately mixing slurries of Paris green and calcium arsenate together at a temperature of about 100° F. to about 120° F. until the particles of said Paris green are thoroughly incorporated with the particles of said calcium arsenate to form amalgamated particles and separating the thus amalgamated Paris green and calcium arsenate from the water.

4. The process of forming an amalgamated product of Paris green and calcium arsenate substantially inseparable upon being air dusted which comprises forming a slurry of Paris green containing about one part of Paris green and about two parts of water, forming a slurry of calcium arsenate containing about one part of calcium arsenate and about two and one quarter parts of water, mixing said Paris green slurry with said calcium arsenate slurry, maintaining a temperature of about 100° F. to about 120° F. in said mixed slurries, agitating said slurries until the particles of said Paris green are thoroughly bonded or amalgamated with said particles of calcium arsenate, separating said amalgamated particles from the water, washing the separated particles substantially free of water soluble substances including sodium sulfate and water soluble arsenious oxide, and drying the precipitate of amalgamated particles of Paris green and calcium arsenate which are substantially inseparable when air dusted.

5. The process set forth in claim 4 in which free lime is contained in the calcium arsenate in sufficient amount to combine with free arsenious acid contained in the Paris green and to form substantially insoluble calcium arsenite.

6. The process set forth in claim 4 in which the Paris green has a relatively low weight and about 50 to about 65 cubic inches thereof weighs about a pound and the amalgamated product has such a density that about 80 to about 90 cubic inches weighs about one pound.

7. An amalgamated product of Paris green and calcium arsenate having such a density that about 80 to about 90 cubic inches thereof weigh about one pound, the Paris green and calcium arsenate of said product being substantially inseparable upon being air dusted.

8. An amalgamated product of Paris green and calcium arsenate having such a density that about 80 to 90 cubic inches thereof weighs about one pound and constituted of about 25% of Paris green and about 75% calcium arsenate, the Paris green and calcium arsenate of said product being substantially inseparable upon being air dusted.

9. A product of Paris green of such a light weight that about 50 to about 65 cubic inches thereof weigh about one pound amalgamated with calcium arsenate to give a composite product of such a weight that about 80 to about 90 cubic inches weighs about one pound, the Paris green and calcium arsenate of said product being substantially inseparable upon being air dusted.

10. An improved composite insecticide containing Paris green and calcium arsenate the particles of which are so bonded together as to be practically inseparable by mechanical means, said composite insecticide having a very light density approximating that of calcium arsenate having such a density that about 80 to 90 cubic inches thereof weighs about one pound.

11. An improved composite insecticide comprising Paris green amalgamated with calcium arsenate containing sufficient free lime to combine free arsenious acid present in said Paris green, said composite insecticide having a very light density approximating that of calcium arsenate having such a density that about 80 to 90 cubic inches thereof weighs about one pound and being practically inseparable when air dusted.

In testimony whereof I hereunto affix my signature.

BYRON PAYNE WEBSTER.